(12) United States Patent
Browning et al.

(10) Patent No.: US 8,458,448 B2
(45) Date of Patent: Jun. 4, 2013

(54) METHOD OF INSTALLING A WIRELESS NETWORK

(75) Inventors: Kenneth J Browning, Essex (GB); Mansel M Thomas, Suffolk (GB)

(73) Assignee: British Telecommunications public limited company, London (GB)

( * ) Notice: Subject to any disclaimer, the term of this patent is extended or adjusted under 35 U.S.C. 154(b) by 110 days.

(21) Appl. No.: 12/935,817

(22) PCT Filed: Mar. 27, 2009

(86) PCT No.: PCT/GB2009/000812
§ 371 (c)(1),
(2), (4) Date: Sep. 30, 2010

(87) PCT Pub. No.: WO2009/122146
PCT Pub. Date: Oct. 8, 2009

(65) Prior Publication Data
US 2011/0019826 A1    Jan. 27, 2011

(30) Foreign Application Priority Data
Mar. 31, 2008 (GB) .................................. 0805803.4

(51) Int. Cl.
*H04L 29/06* (2006.01)

(52) U.S. Cl.
USPC ............... 713/1; 713/100; 713/150; 380/255; 380/278; 726/2

(58) Field of Classification Search
USPC .................. 380/278, 255; 726/2; 713/1, 100, 713/150
See application file for complete search history.

(56) References Cited

U.S. PATENT DOCUMENTS 7,421,266 B1 * 9/2008 Bruestle et al. ............... 455/411
2004/0102218 A1 5/2004 Nago
(Continued)

FOREIGN PATENT DOCUMENTS

EP 1 450 513 A1 8/2004
EP 1 499 067 A 1/2005
(Continued)

OTHER PUBLICATIONS

International Preliminary Report on Patentability dated Oct. 5, 2010, for PCT/GB2009/000812, including the Written Opinion of the International Searching Authority for PCT/GB2009/000812.

(Continued)

*Primary Examiner* — Kambiz Zand
*Assistant Examiner* — Imhotep Durham
(74) *Attorney, Agent, or Firm* — Nixon & Vanderhye P.C.

(57) ABSTRACT

A method of method of installing a wireless communications network configures a client device to connect wirelessly to an access point arranged to provide a wireless communications network. The method comprises running an installation program on the client device for configuring the client device to attach to the wireless communications network. The installation program is automatically provided with wireless network configuration information comprising at least a wireless network identifier which identifies traffic using the wireless communications network. The automatic provision of the wireless network configuration information comprising said wireless network identifier is implemented by connecting an installation device comprising non-volatile memory which stores said information, and configuring said installation program to utilize the information stored on said installation device. The wireless network configuration information stored on said installation device corresponds to the wireless network configuration of said access point and both the installation device and the access point were configured with the wireless network configuration information prior to said installation device being connected to any client terminal arranged to connect to said access point.

21 Claims, 6 Drawing Sheets

U.S. PATENT DOCUMENTS

| | | |
|---|---|---|
| 2004/0264395 A1 | 12/2004 | Rao |
| 2005/0149204 A1 | 7/2005 | Manchester et al. |
| 2005/0198221 A1 | 9/2005 | Manchester et al. |
| 2005/0272371 A1 | 12/2005 | Komatsuzaki et al. |
| 2006/0131431 A1 | 6/2006 | Finn |

FOREIGN PATENT DOCUMENTS

| | | |
|---|---|---|
| EP | 1 553 729 A1 | 7/2005 |
| GB | 2 408 181 A | 5/2005 |
| JP | 2001-189722 | 7/2001 |
| WO | 02/080515 A1 | 10/2002 |
| WO | 2005/029812 A1 | 3/2005 |
| WO | 2005/104652 A2 | 11/2005 |
| WO | 2007/095375 A2 | 8/2007 |
| WO | 2009/122151 A1 | 10/2009 |

OTHER PUBLICATIONS

International Preliminary Report on Patentability dated Oct. 5, 2010, for PCT/GB2009/000830, including the Written Opinion of the International Searching Authority for PCT/GB2009/000830.

International Search Report for PCT/GB2009/000812, mailed Jul. 30, 2009.

Office Action (8 pgs.) dated Jan. 14, 2013 issued in corresponding Chinese Application No. 200980111987.1 with an at least partial English-language translation thereof (12 pgs.).

\* cited by examiner

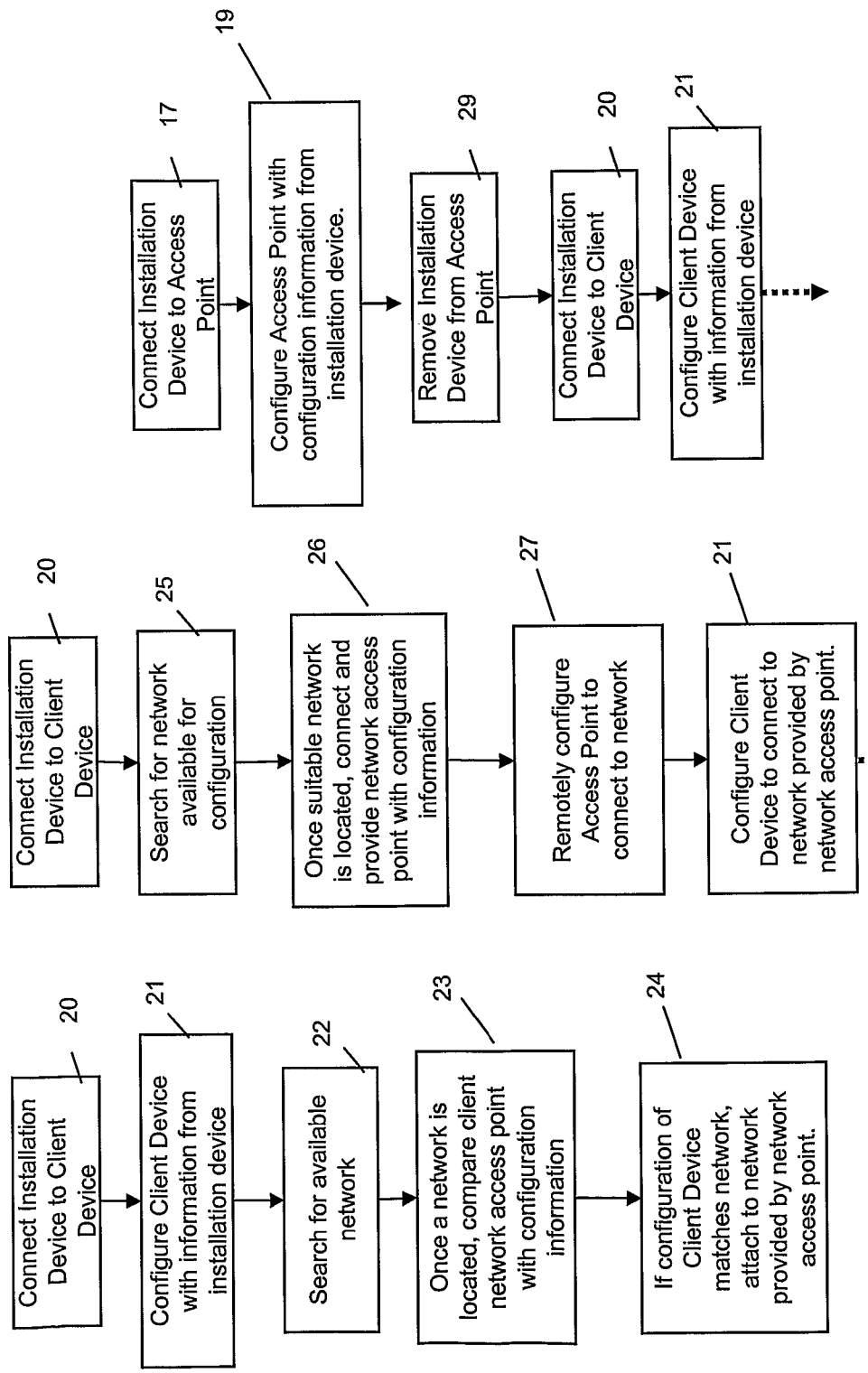

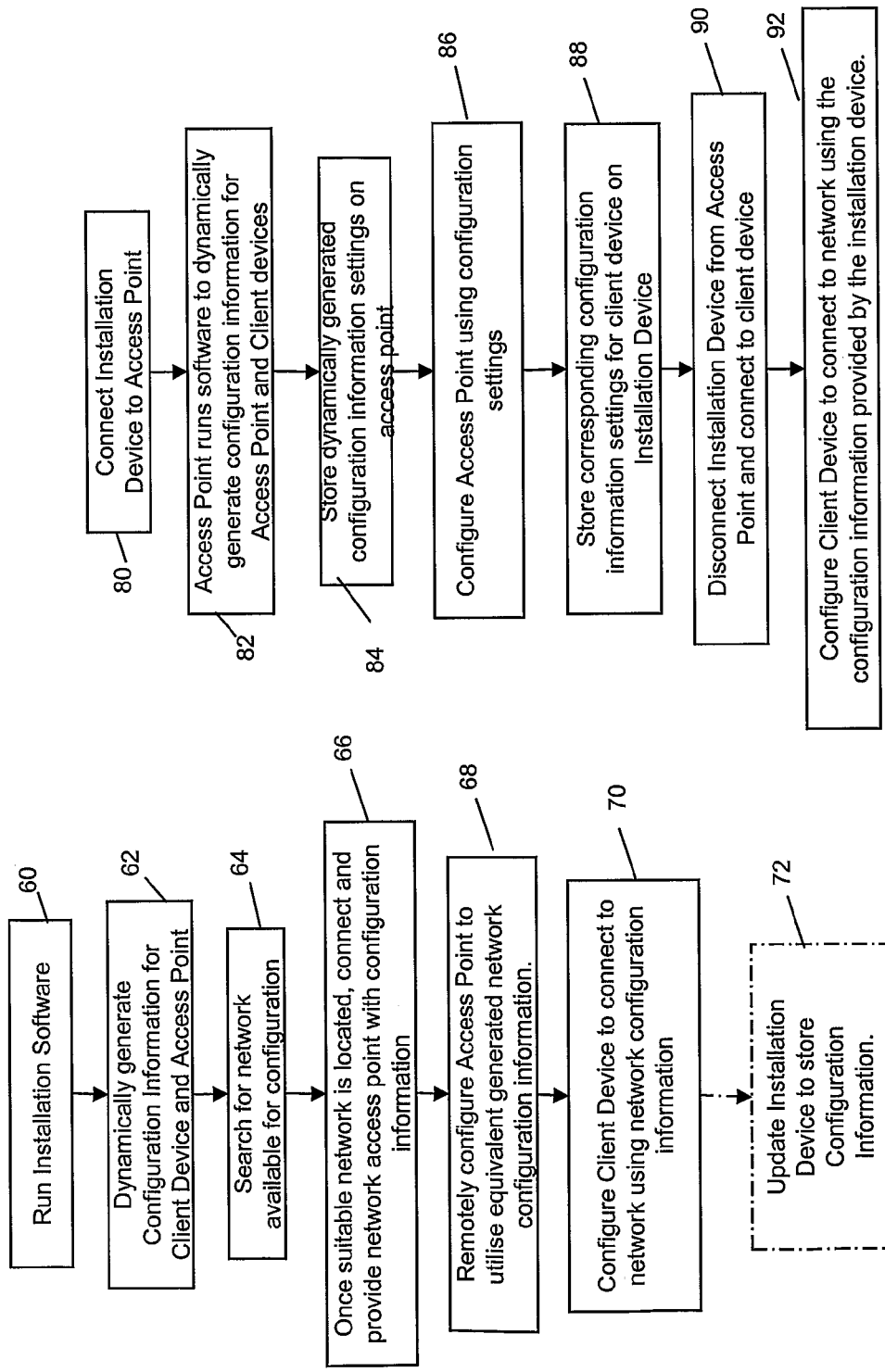

METHOD OF INSTALLING A WIRELESS NETWORK

This application is the U.S. national phase of International Application No. PCT/GB2009/000812 filed 27 Mar. 2009, which designated the U.S. and claims priority to GB Application No. 0805803.4 filed 31 Mar. 2008, the entire contents of each of which are hereby incorporated by reference.

BACKGROUND AND SUMMARY

The present invention relates to a method of installing a wireless communications network comprising a wireless communications network access point and at least one client device configured using a wireless network access installation device and related aspects thereof.

In particular but not exclusively, the invention relates to a method for installing and configuring a wireless network using a computer platform such as a client terminal/device or other suitable computer apparatus by connecting the computer platform to the wireless communications network installation device to enable a wireless connection to a wireless access point to be formed during the installation process.

FIG. 1 of the drawings shows how a computer apparatus can be configured to connect to a pre-existing wireless communications network 1 as known in the art. In FIG. 1, a wireless access point 2 (for example, a wireless communications router or hub type device) is connected via a communications link 4 to a first computer 6 which has previously been used to configure the wireless network 1. In order to connect other apparatus to the wireless network 1, for example to connect another computer (shown in FIG. 1 as a laptop computer 8), the apparatus 8 must be configured to attach to the correct wireless network if more than one network is detected and to use the correct encryption key to enable communications exchanged with the access point 2 to be secure. This requires the installation of appropriate software and appropriate wireless communications hardware. It is known in the art to provide such hardware, e.g., an antenna, in an integrated form with a Universal Serial Bus memory stick type device 10.

Wireless communication needs to be secure so that communication transmissions are private, whether they carry voice or data, which is achieved by encrypting the transmissions. In order to install a wireless network securely, the network needs to be identified somehow and an encryption key used to encode the transmissions over the network. A wireless network identifier well known in the art comprises an "SSID", or Service Set Identifier. The SSID of a wireless local area network (LAN) is a code which identifying the wireless LAN and which distinguishes packets from different LANs operating in the same location.

Two main encryption methods are well-known in the art for wireless networks, WEP and WPA. Wireless Equivalency Privacy (WEP) is supported by the vast majority of 802.11a/b/b equipment and is capable of using 40-bit or 64-bit keys (or longer) to encrypt data between the client device and access point (AP). The Wi-Fi Protected Access (WPA) provides slightly stronger encryption and can use a variety of schemes, either a shared private key, unique keys assigned to each user, or SSL certificates to authenticate the client/access point. The encryption WPA keys can even be rotated over time using Temporal Key integrity Protocol (TKIP). Both WEP and WPA encryption techniques require a security key to be provided to the AP 2 generating the wireless network and which matches that provided to each client device 6,8 which is to communicate with the AP 2.

As a result, to install a wireless communications network such as that shown in FIG. 1 of the accompanying drawings requires the person installing the apparatus to manually configure each client device 6,8 which is to connect with the AP 2 with the appropriate encryption key and network identifier for the network that particular AP 2 is to provide (assuming the AP 2 has been suitably preconfigured, if not then they must first configure the AP and provide the equivalent information to the client devices 6,8).

However, such known installation processes have a high-level of user involvement. The SSID and encryption WPA or WEP must be provided to the AP and each client device, and as these require a long and complicated series of digits and/or letters, there is a high chance of user error occurring resulting in the network not being appropriately installed on the AP and/or client devices or if installed, not being configured to operate in a secure manner.

International Patent Application WO 2005/104652 entitled "System and Associated Terminal, Method, and Computer Program for Configuring and Updating Service Access Points and Providing Service Content Specific Pricing in the Mobile Domain" describes how pre-configured service access point settings may be provided on a multimedia memory card with a client application capable of configuring the service access point settings in a mobile terminal from the pre-configured service access point settings on the memory card.

International Patent Application WO 02/080515 entitled "System and Method for Configuring Network Access Devices" describes using a data storage card or smart card to provide network access equipment with configuration settings. WO 02/080515 describes how when a user initially signs up for a desired service, a subscriber data storage card is prepared by downloading or storing therein the configuration settings compatible with the integrated access device 15 and with an access multiplexer. The subscriber data storage card can be prepared by the network operator or by an application service provider and includes information which configures a router, whereas the access multiplexer port is typically configured by a network operator 41. After the data storage card has been prepared, it is provided to the subscriber 11 for use in configuring the integrated access device 15. WO 02/080515 describes an application service provider 51 controlling a data storage card writer to configure the data storage card. The use of the card enables the configuration settings and information for a plurality of network access devices and access multiplexers to be loaded into one data storage card suitable for installation into any one of several different network access devices, which enables the active data card to be used by subscribers having hardware devices provided by various manufacturers.

US 2005/0149204 entitled "Configuring Network Settings using Portable Storage Media" describes using a portable computer readable media device such as a flash drive or USB memory device to enable automatic configuration of a computing device. Configuration information such as a network key is first entered by a user when using an application running on a first computer platform to set up and configure a wireless network, and these are then transferred using the portable computer readable media device to other devices to enable them to access the wireless network.

To make things simpler for a user of the client device to complete the installation process, it is known in the art to pre-configure an access point device with a given SSID and WEP key and to provide a label on the access point device indicating the SSID and WEP key of that specific device. A user who is installing a wireless network using that access point then reads the label and provides the SSID and WEP key information to the client device they are configuring to use the access point in the form of data which is inputted when prompted to do so by a network installation program running on the client device. This requires the correct label to be attached to the correct access point device as otherwise the information entered by a user will not correspond to the information stored on the access point device. This increases the complexity of the production process of the access points and requires a production line which attaches the labels either manually or electronically to be coordinated with the production of the pre-configured access points.

However, even simplifying matters to this level results in a complex task. For example, the level of user input requires a long series of keystrokes to be correctly entered to generate the encryption keys and to enable the correct wireless network to be identified. As a result, there is still a reasonably high opportunity for human error to occur when inputting the additional data required to configure the wireless network. Another limitation which remains with this installation method is that process remains time-consuming, typically taking several minutes (of the order of five to ten minutes for a typical user).

The present invention seeks to provide a wireless method for installing a wireless communications network which overcomes the limitations known in the art by removing the need for a user to enter wireless network configuration information such as the wireless network key and or SSID information.

The aspects of the invention are as set out herein below and by the accompanying claims and the preferred embodiments are as set out herein below and by the accompanying dependent claims. Those of ordinary skill in the art will be aware that the aspects of the invention and any dependent claims may be combined with each other in any appropriately suitable manner.

A first aspect of the invention seeks to provide a method of installing a wireless communications network by configuring a client device to connect wirelessly to an access point arranged to provide a wireless communications network, the method comprising:
running an installation program on the client device for configuring the client device to attach to the wireless communications network;
automatically providing the installation program with wireless network configuration information comprising at least a wireless network identifier which identifies traffic using the wireless communications network;
wherein the automatic provision of the wireless network configuration information comprising said wireless network identifier is implemented by connecting an installation device comprising non-volatile memory which stores said information, and configuring said installation program to utilise the information stored on said installation device,
wherein the wireless network configuration information stored on said installation device corresponds to the wireless network configuration of said access point, and wherein both the installation device and the access point are configured with said wireless network configuration information prior to said installation device being connected to any client terminal arranged to connect to said access point.

The installation device and the access point are provided with paired wireless network configuration information, i.e., they are configured and distributed together to form a wireless installation network kit.

Another aspect of the invention relates to a method of configuring a client device configured with for connecting wirelessly to an access point arranged to provide a wireless communications network, the method comprising:
running an installation program on the client device for configuring the client device to attach to the wireless communications network;
automatically providing the installation program with wireless network configuration information comprising at least a wireless network identifier which identifies traffic using the wireless communications network;
wherein the automatic provision of the wireless network configuration information comprising said wireless network identifier is implemented by connecting an installation device comprising non-volatile memory which stores said information, and configuring said installation program to utilise the information stored on said installation device.

By installing a wireless network using the above method of configuring a client device, it is possible to automatically configure the first client device to connect to the network. Whereas in the prior art it is known to transfer network configurations between client devices, in the prior art a user must still configure the client device which installs the wireless network by manually entering the network configuration information.

However, this makes the installation process more tedious and skilled for a user and introduces a potential point of human error (if they enter the wrong information etc), accordingly, by storing the wireless network configuration information on a wireless network installation tool comprising a portable data storage device which is arranged to configure a client terminal (which term is used synonymously with client device), the installation procedure becomes more automated as a user needs only to connect the installation tool to the client terminal. This requires, however, the installation tool to store prior to distribution to the user and prior to its connection to any client terminal which is to connect to the access point with which the installation tool is to be associated, the correct wireless network configuration information for that particular wireless network access point.

The method may further comprise automatically providing the installation program with wireless network configuration information comprising an encryption key for encrypting transmissions between the client device and the access point over said wireless communications network.

The installation device may further comprise code for the installation program which, when the installation device is connected to the client device, is loaded onto the client device.

The code may be loaded automatically when said installation device is connected to the client device.

The configuration information may provide the wireless network identifier and/or the wireless encryption key and be loaded with the installation program.

The configuration information may provide the wireless network identifier and/or the wireless encryption key is loaded subsequent to the loading of the installation program.

The method may prior to said step of connecting said installation device to said client device, further comprise connecting the installation device to said access point; and automatically obtaining said wireless network identifier from said access point which is then held in said non-volatile memory of said installation device.

The method may, prior to connecting said installation device to said client device, further comprise:
connecting said installation device to said access point; and
automatically obtaining said encryption key from said access point which is then held in said non-volatile memory of said installation device.

The method may prior to connecting said installation device to the client device, further comprise: connecting said installation device to said access point; and providing configuration information corresponding to said wireless network identifier to said access point, whereby said access point is then configured to provide a wireless communications network having said unique network identifier.

The method may, prior to connecting said installation device to the client device, further comprise: connecting said installation device to said access point; and providing configuration information corresponding to said encryption key to said access point, whereby said access point is then enabled to provide a wireless communications network utilising said encryption key.

When the installation device is connected to the client device, the method may further comprise: detecting if a wireless network is available which meet one or more predetermined network characteristics and which does not have a wireless network identifier; and, sending over said wireless network to said access point, the wireless network identifier stored on said installation device, whereby when said access point receives said wireless network identifier it is arranged to automatically configure itself to utilise said wireless network identifier to identify the wireless network that it provides.

When the installation device is connected to the client device, the method may further comprise: detecting if a wireless network is available which meet one or more predetermined network characteristics and which does not have an encryption key; and, sending over said wireless network to said access point, the encryption key stored on said installation device, whereby when said access point receives said wireless network identifier it is arranged to automatically configure itself to utilise said encryption key to identify the wireless network that it provides.

Another aspect of the invention comprises a wireless communications network installation device arranged to install a wireless communications network using a wireless communications network access point and a client terminal, the device comprising: non-volatile memory storing information; and connection means to connect to said client terminal, wherein, when said client terminal runs an installation program arranged to configure itself to attach to the wireless communications network, and when the installation device is connected to said client terminal, the device installs said wireless communications network by configuring the client device to connect wirelessly to said access point by automatically providing the installation program with wireless network configuration information comprising at least a wireless network identifier which identifies traffic using the wireless communications network; wherein the wireless network configuration information stored on said installation device corresponds to the wireless network configuration of said access point, and wherein both the installation device and the access point are configured with said wireless network configuration information prior to said installation device being connected to any client terminal which uses said access point.

The device may further comprise antenna means arranged to enable said client terminal to form a wireless connection when said device is connected to said client terminal.

The non-volatile memory of said device may comprise flash memory.

The connection means may comprise a universal serial bus connector arranged to connect to said client device.

The connection means may comprise a short-range wireless connection means.

Another aspect of the invention seeks to provide a wireless communications network installation device, the device comprising: data storage means arranged to store wireless communications network configuration information data, means to automatically configure a client terminal with said wireless communications network configuration information, wherein said wireless communications network configuration information enables a client terminal to automatically connect to an associated communications network access point configured with corresponding wireless communications network configuration information after the installation device has been appropriately connected to said client terminal and used to configure said client terminal; wherein said installation device is automatically associated with said access point by co-ordinating the installation of said wireless communications network configuration information on said installation device with the installation of corresponding wireless communications network configuration information on said access point.

Another aspect of the invention seeks to provide a wireless communications network access point configured with wireless communications network configuration information which enables a client terminal appropriately configured using the wireless communications network installation device as claimed in any previous aspect to connect to said wireless communications network access point, wherein said wireless communications network configuration information of said access point and the corresponding wireless communications network configuration information of said wireless communications network installation device collectively enables the client terminal to connect to said access point; and wherein said access point is automatically associated with said installation device by co-ordinating the installation of said corresponding wireless communications network configuration information on said installation device with the installation of said wireless communications network configuration information on said access point.

Another aspect of the invention seeks to provide a wireless communications network installation kit, the kit comprising: an access point configured with access point wireless communications network configuration information; and an associated client terminal network installation device comprising data storage means arranged to store corresponding client terminal wireless communications network configuration information, said access point wireless communications network configuration information and said corresponding client terminal wireless communications network configuration information being collectively arranged to enable a client terminal to connect to said access point once said associated installation device has been appropriately connected to said client terminal and used to configure said client terminal; wherein said installation device is automatically associated with said access point by co-ordinating the installation of said corresponding second wireless communications network configuration information on said installation device with the installation of said first wireless communications network configuration information on said access point.

A data source may co-ordinate the storage of the wireless communications network configuration information data on the installation device and the storage of corresponding wireless communications network configuration information stored on the network access point.

Another aspect of the invention seeks to provide a method of configuring a wireless communications network installation kit, the kit comprising an access point and an associated client terminal installation device, the method comprising: configuring said access point with access point wireless communications network configuration information; and configuring the installation device with client terminal wireless communications network configuration information which corresponds to said access point wireless communications network configuration information so that said access point wireless communications network configuration information and said corresponding client terminal wireless communications network configuration information collectively enable a client terminal to connect to a said access point once an associated installation device has been appropriately connected to said client terminal and used to configure said client terminal, whereby the access point and the wireless network installation device of the wireless communications network installation kit are configured with the same wireless network configuration characteristics.

Another aspect of the invention seeks to provide a method of connecting a client terminal to a wireless communications network comprising: connecting a wireless network installation device to said client terminal; running an installation programme on the client terminal using information derived from the installation device; searching for an available wireless communications network; locating an available wireless communications network; comparing the configuration information of the located and available wireless communications network with configuration information installed using installation device on said client terminal; wherein, if it is determined that the wireless network configuration information installed on the client device matches the wireless network configuration information for said located and available wireless communications network, the method further comprises connecting the client terminal to the wireless communications network.

The above method steps may be implemented entirely or in part by a suite of one or more computer programs, one or more of said computer programs being under the control of data processing means provided on the installation device and/or the client terminal.

BRIEF DESCRIPTION OF THE DRAWINGS

Embodiments of the invention will now be described with reference to the accompanying drawings, which are by way of example only, and in which:

FIGS. 3a to 3e show methods of installing a wireless communications network according to differing embodiments of the invention; and FIGS. 4a and 4b show in more detail features of a method of installing a wireless communications network according to the embodiment of the invention shown in FIG. 3a.

DETAILED DESCRIPTION OF PRESENT EXAMPLE EMBODIMENTS

The best mode of the invention will now be described with reference to the accompanying drawings. Those of ordinary skill in the art will be aware that the description of certain embodiments of the invention provided may omit details which are already well known in the art to implement certain features of the invention for the sake of clarity, and that where the description refers to a feature the reference implicitly also includes any functional equivalents or modifications already known in the art unless these are explicitly excluded.

Figure 1:
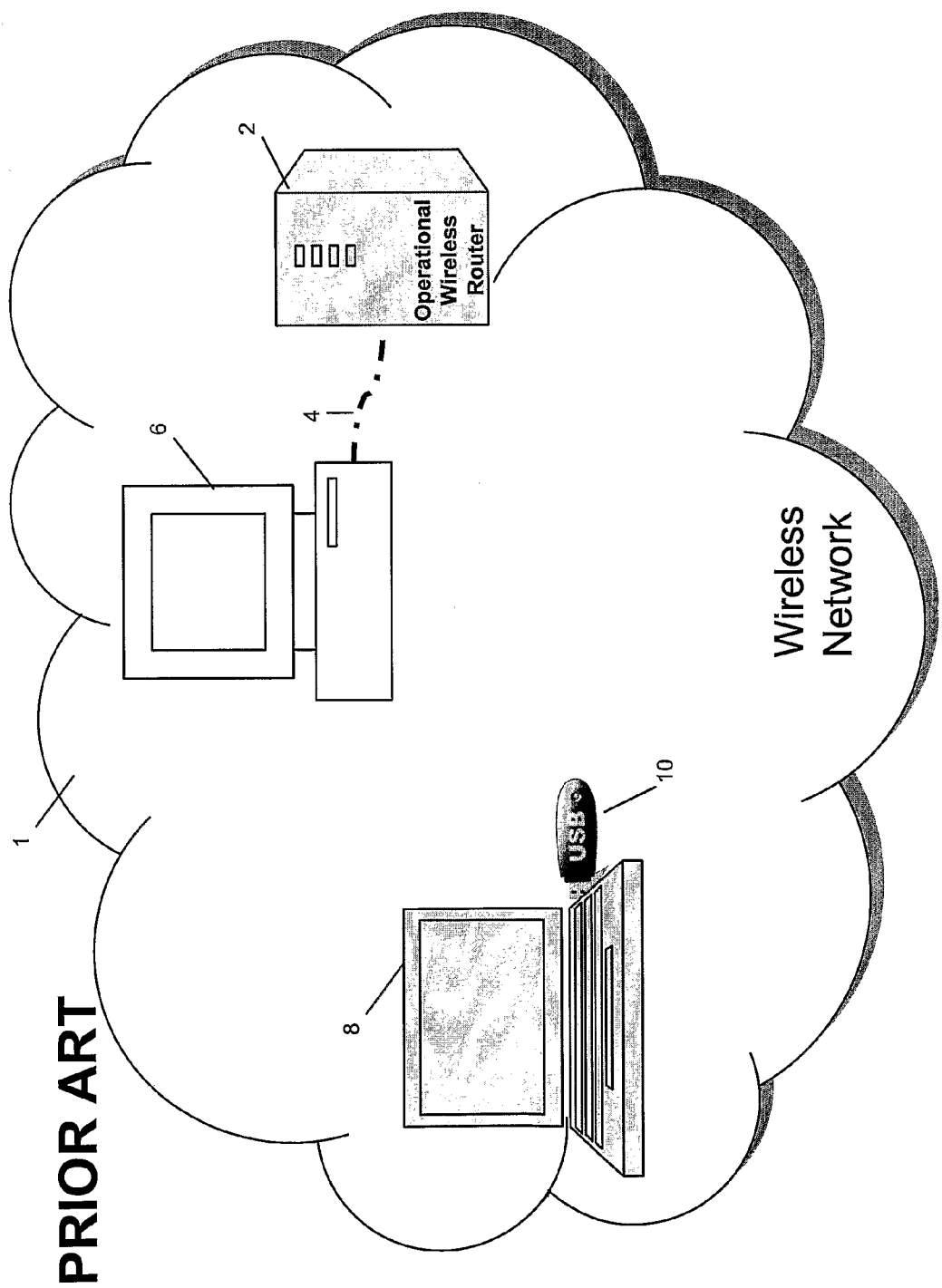
FIG. 1 shows a wireless communications system as known in the art.
Figure 2:
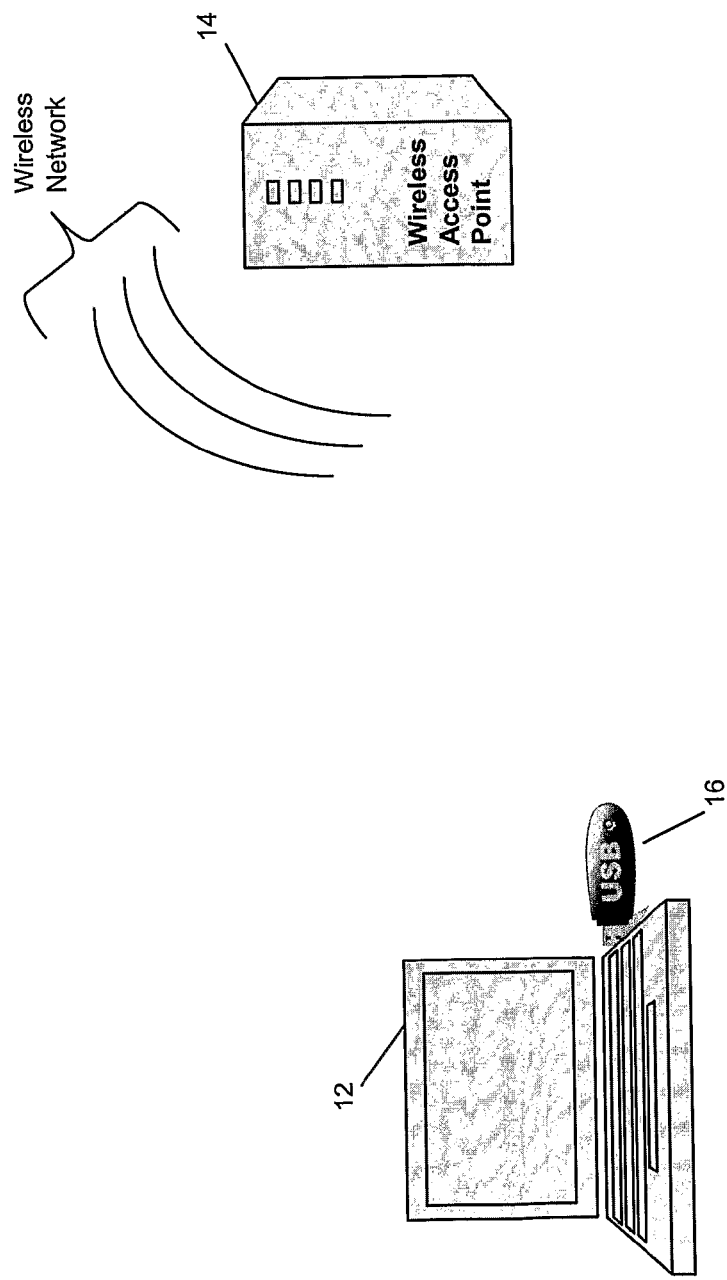
FIG. 2 shows an arrangement of apparatus suitable for implementing a wireless method of installing a wireless communications network according to an embodiment of the invention.

FIG. 2 of the accompanying drawings shows an exemplary scenario in which a user wishes to enable wireless connectivity between at least one client device 12 and a wireless router access point 14. Examples of client devices might include computer apparatus (both desktop and mobile) or other devices such as, for example, gaming consoles, television apparatus, set-top boxes for television apparatus, other domestic household appliances, etc or any other device requiring wireless connectivity). Examples of access points include, for example, a wireless modem/router-type device such as the Home Hub marketed by British Telecommunications plc for the residential market, which enables one or a plurality of devices to form and use wireless communications links. The access point 14 may also be provided in a non-residential environment and offer wireless connectivity to non-residential environment-type client devices.

It is assumed that the access point 14 is preconfigured for onwards connection to a public communications network by a service provider, for example to a wired network such as the PSTN supported by British Telecommunications plc. In alternative embodiments, however, it may also or instead be configured to connect to another wired or wireless network. Alternatively, it may be configured for onwards connectivity only after installation of the local area wireless network in accordance with the invention.

Also shown in FIG. 2 is an installation device 16 according to an embodiment of the invention. In one embodiment of the invention, the installation device 16 comprises suitable hardware components and software components for configuring and enabling a client device to connect to a wireless network such as, for example, an antenna. Alternatively, the hardware components for wireless connectivity such as the antenna may be provided by the client device 12. In one embodiment, the installation device 16 comprises a wireless adapter preprogrammed with information corresponding to the access point 14 with which it is to have wireless connectivity. The installation device 16 in this embodiment further comprises a suitable antenna for detecting an available wireless network and appropriate control functionality, although as mentioned above in alternative embodiments hardware for implementing this functionality is instead provided using components hosted on the client device 12.

In the best mode of the invention, the installation device 16 further comprises a Universal Serial Bus type of connector for connection via a suitable port to the client device 12. The installation device 16 further includes a suitable read and writable non-volatile memory component for storing configuration information arranged to enable the client device 12 to connect to the wireless access point 12 over a wireless network provided by the wireless access point 14. Examples of suitable non-volatile memory components include flash memory or any other suitable form of read and writable memory component such as, for example, a Electrically Erasable Programmable Read-Only Memory component, or a micro-drive memory component.

The memory component has sufficient capacity to at least store configuration data comprising a network identifier and/or wireless encryption key and may optionally also store generic installation data and/or other information. As the network identifier and/or wireless encryption key are preferably unique per installation device, the memory is preferably of a form to which such unique data can be quickly and efficiently written to. The configuration data is either pre-installed in the memory component prior to being used for configuring the client device 12, in which case it is paired with equivalent configuration information stored by the access point 14, or, in alternative embodiments of the invention, the configuration information is dynamically generated during the installation process, in which case the installation device is used to configure both the client device 12 and the wireless access point 14 with the paired equivalent configuration information.

A method of installing a wireless network according to one embodiment of the invention requires generic installation software implementing an installation computer program to run on the client device 12 in order to configure the client device 12 to connect to the relevant access point. This generic installation software may, for example, be used to configure any antenna and/or tuner components etc provided on the client device 12 and/or to configure one or more equivalent/complementary components on the installation device 16. If this generic installation code is not to be provided by the installation device itself, this information is assumed to be pre-provided on the client device 12, for example, by installing the code using another carrier medium which the client device has access to, for example, via a CD-ROM or DVD or electronic download prior to attaching the installation device 16.

FIGS. 3*a*, 3*b*, 3*b* summarize various embodiments of a wireless method of installing a wireless communications network to enable wireless connectivity between a first client device 12 and the access point 14 using the installation device 16 as shown in FIG. 2.

A first embodiment of the invention assumes the access point 14 is preconfigured with access point configuration information comprising at least a wireless network identifier and wireless encryption key. The access point configuration information is paired with equivalent client device configuration information provided on the installation device 16. The paired client device information provides sufficient information to configure the client device 12 to have secure wireless connectivity with the configured access point 14. Examples of configuration information include information which uniquely identifies the access point 14 (such as an SSID for example) and an encryption key for data provided over wireless connections with the access point 14 (for example, such as a WEP or WAP key).

In FIG. 3*a*, the client device 12 is first configured using the generic installation software described hereinabove. This generic installation software needs to be provided with additional information comprising the configuration information for the client device 12 corresponding to the configuration information of the wireless access point 14. The client configuration information, which is not generic and is preferably unique to the client device 12, enables the client device 12 to identify the wireless network which the access point 14 provides and enables the communications sent over the network to be appropriately encrypted and decrypted by the relevant one of the access point/client device. As previously described herein above, the generic installation software runs on the client device 12 and either loads the paired configuration information from the installation device 16 at the appropriate point during execution of the installation program or alternatively (for example, if the installation program itself is provided by the installation device) when the installation program is loaded and runs on the client device this can incorporate the necessary paired configuration information.

In either case, however, the installation proceeds without the user entering any configuration information and may, in the best mode of the invention, proceed in a fully automated manner without user, input apart from directory tree and/or licence acceptance.

The installation device 16 (for example in the form of a wireless adapter) is connected to the client device 12 by a user (step 20 in FIG. 3*a*) either prior to running the generic installation software (which is necessary if the installation device is to automatically load the generic installation software itself) or at one or more points prompted by the generic installation program. Once the installation device 16 is connected to the client device 12, the unique information required to form a wireless connection to the access point 14 is provided automatically to configure the client device 12 to be capable of forming a wireless connection with access point 14 (shown as step 21 in FIG. 3*a*).

The client device 12 then searches for available wireless networks (step 22 in FIG. 3*a*), and once a suitable wireless network has been located (for example, a network which meets one or more wireless network characteristic criteria such as quality of signal strength exceeding a threshold value or noise being less than a threshold value), the installation programme compares the information identifying the network with the information provided by the installation device 16. If this is a match, the correct network has been identified for that installation device 16 and the encryption keys will also be checked to confirm they match (step 23 in FIG. 3*a*). Once the installation programme has confirmed that the client device 12 has the capability to for wireless connectivity via the access point 14, it attaches the client device 12 to the network provided by the access point 14 (step 24) and the client device will be ready for use.

In one alternative embodiment (not shown in the drawings) the installation device 16 is first connected to the access point 14 and retrieves from the access point 14 the appropriate paired configuration information, for example, the same network identifier and encryption key. Once this information has been transferred to the installation device 16, the user is alerted using appropriate means provided either on the installation device 16 or the access point 14 that the information transfer is complete. The user then disconnects the installation device 16 from the access point 14 and connects the installation device 16 to the client device 12. The configuration of the client device then proceeds as per FIG. 3*a*.

FIGS. 3*b* and 3*c* show alternative embodiments in which the same installation device 16 is first used to configure the access point 14 before being used to configure the client device 12.

In FIG. 3*b*, it is assumed that although access point 14 has power and can function as an access point, it has not yet been fully configured to provide secure network access. Accordingly, at the start of the network installation programme point the network generated by the access point is only available for configuration purposes and cannot be used securely by a client device 12.

In order to configure the access point 14 according to this embodiment of the invention, the client device 12 is connected first to the installation device 16 (step 20). The installation device has the features and components described previously in the context of FIG. 3*a*.

In FIG. 3*b*, the installation device 16 is preconfigured with suitable configuration information enabling the remote configuration of the access point 14 in addition to configuration information enabling configuration of the client device 12. The client device 12 then searches for a suitable candidate network for completing the network configuration (step 25).

If a network is determined to already have both a SSID and WEP key, for example, then the network is pre-configured and it is not considered as a candidate network for this embodiment of a wireless network installation method. One or more candidate networks may be detected during a network scan and, if so, the installation process will perform one or more checks in order to ensure the correct network is selected, that is to say, to ensure the client device 12 select the correct network corresponding to the network provided by the access point 14 that that particular client device 12 is to attach to.

Suitable checking processes could require the candidate network which meet one or more network characteristic criteria, for example, signal strength and/or QoS etc. Once a network available for configuration has been located, the network access point 14 is provided with configuration information by transmitting this from the client device (step 26). To implement this, a suitable protocol governing the detection by the access point 14 of the client device 12b is implemented to enable the information to be provided from the wireless adaptor 16 to configure the access point 14 which can be implemented using any suitable process known in those of ordinary skill in the art.

Once the network has been configured with the relevant configuration information provided by the installation device 16, the installation device 16 remains attached to the client device 12 and is used to configure the client device 12 to use the configured network offered by the access point 14 in the manner described in FIG. 3a.

FIG. 3c shows a third alternative embodiment. In FIG. 3c, instead of the installation device 16 being first attached to the client device 12 and remaining attached during both the remote configuration of the access point 14 and the subsequent configuration of the client device as in FIG. 3b, the installation device 16 is instead first connected to the access point 14 either directly or via a suitable adaptor (not shown) (step 17).

In this embodiment, the access point 14 is configured (step 19) using information that the installation device 16 provides to ensure that the information identifying the wireless network and the encryption key is suitably paired with that which will be later used to configure the client device 12. An alert may be provided to indicate to a user when the installation process has completed either in the form of a suitable display or sound on the installation device or on the access point 14 and/or a suitable release device or button may be provided. Once the access point 14 has been suitably configured, the installation device 16 is disconnected from the access point (step 29) and is then connected to the client device 12 (step 20). The configuration of the client device 12 then follows the remaining steps for installation shown in FIG. 3a.

FIGS. 3d and 3e of the accompanying drawings each show an alternative embodiment of the invention in which a method of installing a wireless communications network uses configuration information dynamically generated, either programmatically and/or via user input. In FIG. 3d, the configuration information is first generated on the client device 12 and the installation device stores this information and provides it to the access point 14. In FIG. 3e, the configuration information is first generated on the access point 14 and then stored on the installation device which is then used to provide the corresponding configuration information to the client device 12.

Returning first to FIG. 3d, the client device 12 runs installation software (60) which dynamically generates configuration information for the client device 12 and the access point 14 (step 62) during the installation process which is then transferred to the installation device 16 at some point. This information may be generated using any appropriate technique known in the art as suitable for generating random or pseudo random information to preferably ensure each client device generates unique configuration information for at least the wireless encryption key and/or a wireless network identifier. This information is then used to generate paired configuration information for the access point 14.

The client device 12 then searches for a suitable candidate network for completing the network configuration (step 64). If a network is determined to already have both a SSID and WEP key, for example, then the network is pre-configured and it is not considered as a candidate network for this embodiment of a wireless network installation method. One or more candidate networks may be detected during a network scan and, if so, the installation process will perform one or more checks in order to ensure the correct network is selected, that is to say, to ensure the client device 12 selects the correct network corresponding to the network provided by the access point 14 that that particular client device 12 is to attach to. Suitable checking processes could require the candidate network which meet one or more network characteristic criteria, for example, signal strength and/or QoS etc. Once a network available for configuration has been located, the network access point 14 is provided with configuration information by transmitting this from the client device 12 using a suitable protocol to govern the installation by the access point 14 of the configuration instructions provided by client device 12. The client device 12 is then also configured to attach to the network using the settings which were generated by the installation process (step 70). At some appropriate point, shown as the final step in FIG. 3d, the installation device 16 will store the dynamically generated configuration information to enable other client devices to be attached to the wireless network offered by the access point 14 using the same configuration settings, i.e., for example, using the same wireless network identifier and encryption key information.

As an alternative to the above embodiment, once the corresponding information has been written to the installation device 16 by the installation software, the installation device 16 may instead be disconnected from the client device 12 and connected to the access point 14 either directly and/or via a suitable adaptor, and the configuration information transferred to the access point 14 directly.

FIG. 3e shows a variation to the process shown previously in FIG. 3c where the installation configuration information is not stored on the installation device initially, but is instead generated dynamically during the installation process. In FIG. 3e, the installation device is connected to the access point 14 (step 80) and either overrides any existing settings or triggers the automatic execution of an initialization program which dynamically generates appropriate configuration information for the access point (step 82). The dynamically generated settings are then stored on the access point 14 (step 84) and used to configure the access point appropriately (84). Corresponding configuration information for a client device is then stored on the installation device 16 (step 88), and the installation device is then disconnected from the access point 14 and connected to the client device 12 (step 90). At this point the client device runs its installation software utilizing the configuration information provided by the installation device along the manner shown in FIG. 3a in order to configure itself to have wireless connectivity to access point 14 (step 92).

In one embodiment, the installation software running on the client device 12 stores the configuration information for itself and other client devices and/or the access point to the memory of the installation device 16 to enable subsequent installations to be completed for other client devices to have wireless connectivity to the same access point 14 and/or to enable the access point to be reconfigured in the event it requires such a step.

Figure 4A:
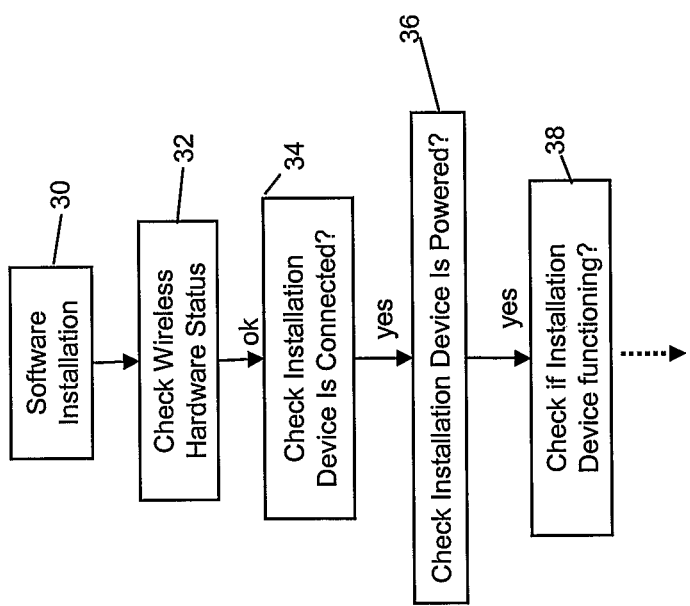

An embodiment of a method of installing a wireless network will now be described in more detail with reference to FIG. 4a of the accompanying drawings.

The method starts by requiring the installation software to be installed on the relevant client device (step 30). As mentioned hereinabove, this could be achieved by loading a CD-ROM, DVD or other type of non-volatile memory device providing a carrier medium for the installation software or as a software download and/or be loaded using the installation device 16 itself.

As soon as the software is installed, it is configured to find out the status of the hardware required to form a wireless connection with the remote access point 14. The hardware may be provided either on the installation device 16 or on the client device 12. The installation process then checks that the installation device 16 is connected to client device 12 (step 38) and that it is powered (step 36) and functioning (step 38), i.e. that the installation device 16 is able to detect a wireless network.

Figure 4B:
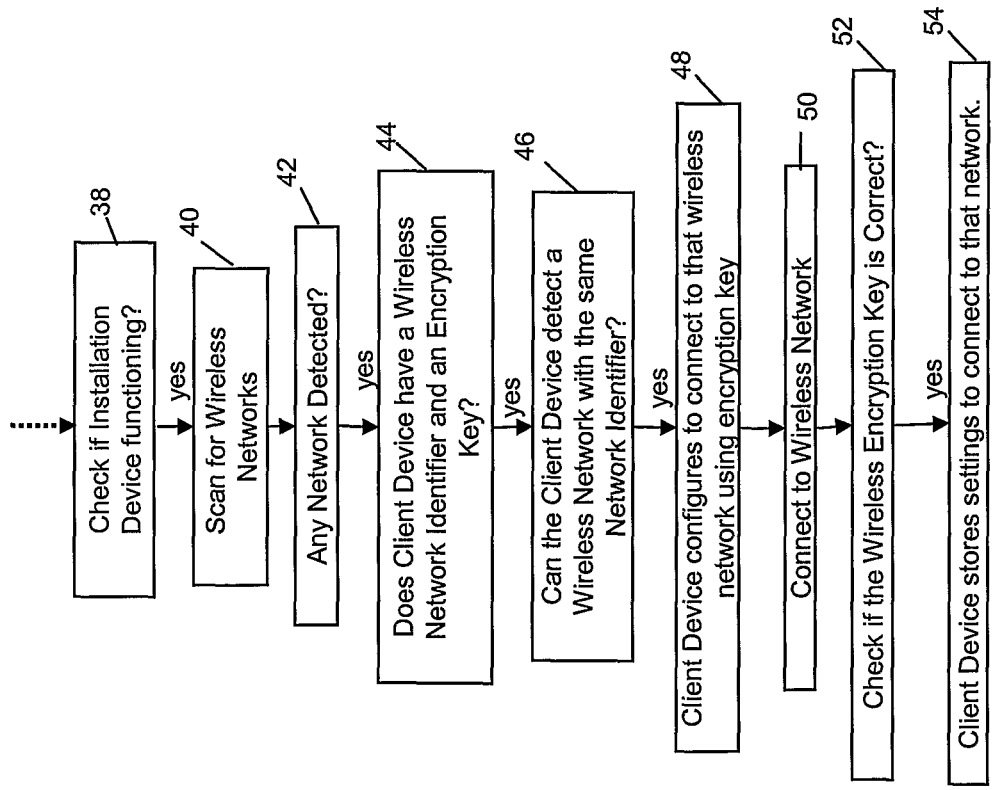

The method of wirelessly installing a wireless network continues now in FIG. 4b of the accompanying drawings. At this point, the installation device 16 has no knowledge of its environment and so conducts a scan for available wireless networks (step 40). If the installation device 16 detects one or more wireless networks (step 42), the installation process then confirms that the client device 12 has loaded the appropriate paired configuration information to connect to a specific network, for example, as shown in FIG. 4b, the process checks that the client device 12 has a wireless network identifier and an encryption key such as WEP and a SSID type network identifier. If for some reason these were not available, then in one embodiment of the invention, the installation program reverts back to requesting manual input from a user for missing information (not shown) or reinsertion of the installation device 16 into the client device 12.

Assuming the installation program finds the paired configuration information on the installation device 16 or already on the client device 12, it checks if any detected networks have corresponding configuration information so that the correct network for the client device 12 to attach to can be identified (step 46). Once such the correct network has been located, the client device is configured to have the correct wireless connectivity information using the encryption key (step 48). The client device 12 then connects to the identified network (step 50) and confirms the encryption key it has is correct for that network (step 52). The client device 12 then stores the relevant settings for wireless connectivity with the access point 14 (step 54) so that the client device 12 is able to reattach to the same wireless network access point after a sleep or reboot. In this manner, the information provided by the installation device 16 is paired on the client device 12 to match that provided on the wireless access point 14.

The above embodiments of the invention provide a method of installing and/or configuring a wireless communications system using a portable memory device.

The portable memory device comprises non-volatile computer memory that can be programmed uniquely with unique additional data to provide wireless encryption as well as generic data which enables a wireless communications system to be installed and configured. The non-volatile memory is preferably flash memory which is provided in the form of a USB device or memory card, which is a form of Electronically Erasable Programmable Read-Only Memory (EEPROM), although the latter is erasable in small blocks (typically bytes), whereas flash memory is programmable in larger blocks.

Those of ordinary skill in the art will be aware that the configuration of the client device 12 may precede that of the access point 14 in appropriate embodiments of the invention.

Those of ordinary skill in the art will be further aware that where the description refers to a process capable of being implemented using software, the description is also intended to include other means of executing the same instruction sets as the software, for example, in hardware and/or firmware and/or any combination thereof as possible and appropriate.

Exemplary embodiments of the invention were described in detail herein above and pictorially in the accompanying drawings, however, the invention is not intended to be limited to exemplary embodiments but includes various obvious modifications and equivalent arrangements, which fall within the purview of the appended claims. Features referred to explicitly herein and in the claims may be replaced with alternative features providing functional equivalents where such functional equivalents would be known to those of ordinary skill in the art.

In the above description, references to "one embodiment," "an embodiment," "example embodiment," "various embodiments," etc., indicate that the embodiment(s) of the invention so described include a particular feature, structure, or characteristic. However, it is not necessary for every embodiment to comprise that particular feature, structure, or characteristic. Where the phrase "in one embodiment," or "in an exemplary embodiment," is referred to herein above it may or may not refer to the same embodiment as would be apparent to one of ordinary skill in the art.

Where appropriate, terms referring to features such as, for example, "processing," "computing," "calculating," "determining," or the like refer to an action and/or process(es) undertaken by a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term client terminal refers to a suitable configured "computing platform", which comprises one or more data processors, where a data "processor" refers to any device or portion of a device that processes electronic data from registers and/or memory to transform that electronic data into other electronic data that is capable of being stored in registers and/or memory.

Where one or more embodiments of the invention include apparatuses for performing the operations of the methods described here herein. An apparatus may be specially constructed for the desired purposes, or it may comprise a general purpose device selectively activated or reconfigured by a program stored in the device. One or more embodiments of the methods according to the invention are implemented as instructions stored on a machine-readable medium, which may be read and executed by a computing platform to perform the operations described herein. The term "machine-readable medium" comprises any mechanism for storing or transmitting information in a form readable by a machine (e.g., a computer). Examples of machine-readable mediums include, but are not limited to: read only memory (ROM), random access memory (RAM), magnetic disk storage media, optical storage media, flash memory devices, and propagated electrical, optical, acoustical or other suitable digital and/or analogue signals (for example, carrier waves, infrared signals, digital signals, etc).

References to the term "computer program" and/or "computer control logic" include as appropriate references to machine code and/or executable code and/or source code which when compiled results in execution on a computing platform of the computer program.

A computer program may be provided in an electronically downloadable format or in a format which is stored in the main memory and/or secondary memory of a computing platform and/or data storage means capable of being attached and removed from a computing platform, for example, the wireless network installation device. Where the wireless network installation computer program is stored in such data storage means it comprises a computer program product. Such computer programs, when executed, are arranged to enable the client terminal, i.e., a computer platform or system, to perform the features of the present invention as discussed herein. In particular, the computer programs, when executed, are arranged to enable a processor to implement one or more steps in a method according to an embodiment of the invention. Accordingly, such computer programs may represent data controllers of the computer system.

Another embodiment of the invention comprises a computer program product comprising a computer readable medium having control logic (computer software) stored therein. The control logic, when executed by a processor causes the processor to perform the functions of an embodiment of the invention as described herein.

In another exemplary embodiment of the invention implemented using software, the software is stored in a computer program product and loaded into a computer system using said data storage means and/or a hard drive and/or via a network communications interface card. Software implementing control logic executed by a data processor causes the processor to perform the functions of an embodiment of the invention as described herein.

The embodiments and examples discussed herein are non-limiting examples. The embodiments of the invention described in detail herein above form exemplary embodiments only and it will be apparent to those skilled in the art that changes and modifications may be made without departing from the spirit and scope of the invention, for example, in its broader aspects. The embodiments, of the invention as defined in the claims are intended to cover all such changes and modifications as fall within the true spirit of the invention.

What is claimed is:

1. A method of installing a wireless communications network by configuring a client device to connect wirelessly to an access point arranged to provide a wireless communications network, the method comprising:
    running an installation program on the client device for configuring the client device to attach to the wireless communications network;
    automatically providing the installation program with wireless network configuration information comprising at least a wireless network identifier which identifies traffic using the wireless communications network;
    wherein the automatic provision of the wireless network configuration information comprising said wireless network identifier is implemented by connecting an installation device comprising non-volatile memory which stores said information, and configuring said installation program to utilise the information stored on said installation device,
    wherein the wireless network configuration information stored on said installation device corresponds to the wireless network configuration of said access point, and wherein both the installation device and the access point are configured with said wireless network configuration information prior to said installation device being connected to any client device arranged to connect to said access point,
    wherein, when the installation device is connected to the client device, the method further comprises:
        detecting if a wireless network is available which meets one or more predetermined network characteristics and which does not have a wireless network identifier; and,
        sending over said wireless network to said access point, the wireless network identifier stored on said installation device, whereby when said access point receives said wireless network identifier it is arranged to automatically configure itself to utilise said wireless network identifier to identify the wireless network that it provides.

2. A method as claimed in claim 1, further comprising automatically providing the installation program with wireless network configuration information comprising an encryption key for encrypting transmissions between the client device and the access point over said wireless communications network.

3. A method as claimed in claim 1, wherein the installation device further comprises code for the installation program which, when the installation device is connected to the client device, is loaded onto the client device.

4. A method as claimed in claim 3, wherein the code is loaded automatically when said installation device is connected to the client device.

5. A method as claimed in claim 1, wherein the configuration information providing the wireless network identifier and/or a wireless encryption key is loaded with the installation program.

6. A method as claimed in claim 1, wherein the configuration information providing the wireless network identifier and/or a wireless encryption key is loaded subsequent to the loading of the installation program.

7. A method as claimed in claim 1 further comprising:
    prior to said step of connecting said installation device to said client device,
    connecting the installation device to said access point; and
    automatically obtaining said wireless network identifier from said access point which is then held in said non-volatile memory of said installation device.

8. A method as claimed in claim 1, the method comprising:
    prior to connecting said installation device to said client device,
    connecting said installation device to said access point, when
    automatically obtaining said encryption key from said access point which is then held in said non-volatile memory of said installation device.

9. A method as claimed in claim 1, the method further comprising:
    prior to connecting said installation device to the client device,
    connecting said installation device to said access point; and
    providing configuration information corresponding to said wireless network identifier to said access point, whereby said access point is then configured to provide a wireless communications network having said unique network identifier.

10. A method as claimed in claim 1, the method further comprising:
    prior to connecting said installation device to the client device, connecting said installation device to said access point; and providing configuration information corresponding to said encryption key to said access point, whereby said access point is then enabled to provide a wireless communications network utilising said encryption key.

11. A method as claimed in claim 1, wherein, when the installation device is connected to the client device, the method further comprises:

detecting if the wireless network is available which meet one or more predetermined network characteristics and which does not have an encryption key; and, sending over said wireless network to said access point, the encryption key stored on said installation device, whereby when said access point receives said wireless network identifier it is arranged to automatically configure itself to utilise said encryption key to identify the wireless network that it provides.

12. A wireless communications network installation device arranged to install a wireless communications network using a wireless communications network access point and a client terminal, the device comprising:

non-volatile memory storing configuration information; and a connector to connect to said client terminal, wherein, when said client terminal runs an installation program arranged to configure itself to attach to the wireless communications network, and when the installation device is connected to said client terminal, the device installs said wireless communications network by configuring the client terminal to connect wirelessly to said access point by automatically providing the installation program with wireless network configuration information comprising at least a wireless network identifier which identifies traffic using the wireless communications network;

wherein the wireless network configuration information stored on said installation device corresponds to the wireless network configuration of said access point, and wherein both the installation device and the access point are configured with said wireless network configuration information prior to said installation device being connected to any client terminal which uses said access point wherein, when the installation device is connected to the client terminal:

if a wireless network is available which meets one or more predetermined network characteristics and which does not have a wireless network identifier is detected; and said installation device is configured to send over said wireless network to said access point, the wireless network identifier stored on said installation device, whereby when said access point receives said wireless network identifier it is arranged to automatically configure itself to utilize said wireless network identifier to identify the wireless network that it provides.

13. An installation device as claimed in claim 12, further comprising antenna arranged to enable said client terminal to form a wireless connection.

14. An installation device as claimed in claim 12, wherein said non-volatile memory comprises flash memory.

15. An installation device as claimed in claim 12, wherein said connector comprises a universal serial bus connector arranged to connect to said client terminal.

16. An installation device as claimed in claim 12, wherein said connector comprises a short-range wireless connector.

17. A wireless communications network installation device, the device comprising:

data storage means arranged to store wireless communications network configuration information data, means to automatically configure a client terminal with said wireless communications network configuration information, wherein said wireless communications network configuration information enables a client terminal to automatically connect to an associated communications network access point configured with corresponding wireless communications network configuration information after the installation device has been appropriately connected to said client terminal and used to configure said client terminal;

wherein said installation device is automatically associated with said access point by coordinating the installation of said wireless communications network configuration information on said installation device with the installation of corresponding wireless communications network configuration information on said access point, wherein, when the installation device is connected to the client terminal;

if a wireless network is available which meets one or more predetermined network characteristics and which does not have a wireless network identifier is detected; and the wireless network identifier stored on said installation device is sent over said wireless network to said access point, whereby when said access point receives said wireless network identifier it is arranged to automatically configure itself to utilize said wireless network identifier to identify the wireless network that it provides.

18. A wireless communications network access point configured with wireless communications network configuration information which enables a client terminal appropriately configured using the wireless communications network installation device as claimed in claim 1 to connect to said wireless communications network access point, wherein said wireless communications network configuration information of said access point and the corresponding wireless communications network configuration information said wireless communications network installation device collectively enables the client terminal to connect to said access point; and said access point is automatically associated with said installation device by coordinating the installation of said corresponding wireless communications network configuration information on said installation device with the installation of said wireless communications network configuration information on said access point.

19. A wireless communications network installation kit, the kit comprising:

an access point configured with access point wireless communications network configuration information; and an associated client terminal network installation device comprising data storage means arranged to store corresponding client terminal wireless communications network configuration information, said access point wireless communications network configuration information and said corresponding client terminal wireless communications network configuration information being collectively arranged to enable a client terminal to connect to said access point once said associated installation device has been appropriately connected to said client terminal and used to configure said client terminal;

wherein said installation device is automatically associated with said access point by coordinating the installation of said corresponding client terminal wireless communications network configuration information on said installation device with the installation of said access point wireless communications network configuration information on said access point wherein, when the installation device is connected to the client terminal:
- if a wireless network is available which meets one or more predetermined network characteristics and which does not have a wireless network identifier is detected; and
- the wireless network identifier stored on said installation device is sent over said wireless network to said access point, whereby when said access point receives said wireless network identifier it is arranged to automatically configure itself to utilize said wireless network identifier to identify the wireless network that it provides.

20. A wireless communications network installation kit as claimed in claim 19, wherein a data source co-ordinates the storage of the wireless communications network configuration information data on the installation device and the storage of corresponding wireless communications network configuration information stored on the network access point.

21. A method of configuring a wireless communications network installation kit, the kit comprising an access point and an associated client terminal installation device, the method comprising:

configuring said access point with access point wireless communications network configuration information; and configuring the installation device with client terminal wireless communications network configuration information which corresponds to said access point wireless communications network configuration information so that said access point wireless communications network configuration information and said corresponding client terminal wireless communications network configuration information collectively enable a client terminal to connect to a said access point once an associated installation device has been appropriately connected to said client terminal and used to configure said client terminal, whereby the access point and the wireless network installation device of the wireless communications network installation kit are configured with the same wireless network configuration characteristics, wherein, when the installation device is connected to the client terminal, the method comprises:
- detecting if a wireless network is available which meets one or more predetermined network characteristics and which does not have a wireless network identifier; and
- sending over said wireless network to said access point, the wireless network identifier stored on said installation device, whereby when said access point receives said wireless network identifier it is arranged to automatically configure itself to utilize said wireless network identifier to identify the wireless network that it provides.

* * * * *

UNITED STATES PATENT AND TRADEMARK OFFICE
CERTIFICATE OF CORRECTION

PATENT NO. : 8,458,448 B2  Page 1 of 1
APPLICATION NO. : 12/935817
DATED : June 4, 2013
INVENTOR(S) : Browning et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 205 days.

Signed and Sealed this
Eighth Day of September, 2015

Michelle K. Lee
*Director of the United States Patent and Trademark Office*